US011110922B2

(12) United States Patent
Beller et al.

(10) Patent No.: US 11,110,922 B2
(45) Date of Patent: Sep. 7, 2021

(54) VEHICLE TRAJECTORY MODIFICATION FOR FOLLOWING

(71) Applicant: Zoox, Inc., Foster City, CA (US)

(72) Inventors: Andrew E. Beller, San Francisco, CA (US); Janek Hudecek, Redwood City, CA (US); William Anthony Silva, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 86 days.

(21) Appl. No.: 16/181,164

(22) Filed: Nov. 5, 2018

(65) Prior Publication Data

US 2020/0139967 A1  May 7, 2020

(51) Int. Cl.
*G05D 1/00* (2006.01)
*G05D 1/02* (2020.01)
*B60W 30/165* (2020.01)
*B60W 30/14* (2006.01)

(52) U.S. Cl.
CPC ........ *B60W 30/165* (2013.01); *B60W 30/143* (2013.01); *G05D 1/0088* (2013.01); *G05D 1/0223* (2013.01); *B60W 2554/80* (2020.02); *B60W 2754/10* (2020.02); *G05D 2201/0213* (2013.01)

(58) Field of Classification Search
CPC ............. B60W 30/165; B60W 30/143; B60W 2754/10; B60W 2554/80; G05D 1/0088; G05D 1/0223; G05D 2201/0213
See application file for complete search history.

(56) References Cited

U.S. PATENT DOCUMENTS

2018/0120843 A1\* 5/2018 Berntorp .............. G05D 1/0212
2018/0251126 A1   9/2018 Linscott et al.
2019/0346845 A1\* 11/2019 Rottkamp ......... B60W 30/0956

FOREIGN PATENT DOCUMENTS

CN            208292356 A      7/2018

OTHER PUBLICATIONS

The Invitation to Pay Additional Fees dated Apr. 20, 2020 for PCT Application No. PCT/US2019/059769, 15 pages.
The PCT Search Report and Written Opinion dated Jun. 24, 2020 for PCT Application No. PCT/US2019/059769, 21 pages.

\* cited by examiner

*Primary Examiner* — Peter D Nolan
*Assistant Examiner* — Ashley L Redhead, Jr.
(74) *Attorney, Agent, or Firm* — Lee & Hayes, P.C.

(57) ABSTRACT

Techniques for determining to modify a trajectory based on an object are discussed herein. A vehicle can determine a drivable area of an environment, capture sensor data representing an object in the environment, and perform a spot check to determine whether or not to modify a trajectory. Such a spot check may include processing to incorporate an actual or predicted extent of the object into the drivable area to modify the drivable area. A distance between a reference trajectory and the object can be determined at discrete points along the reference trajectory, and based on a cost, distance, or intersection associated with the trajectory and the modified area, the vehicle can modify its trajectory. One trajectory modification includes following, which may include varying a longitudinal control of the vehicle, for example, to maintain a relative distance and velocity between the vehicle and the object.

20 Claims, 4 Drawing Sheets

VEHICLE TRAJECTORY MODIFICATION FOR FOLLOWING

BACKGROUND

Planner systems utilize information associated with objects in an environment to determine how to traverse the environment. For example, some existing planner systems consider relative positions to such objects to determine how to traverse the environment. Planner systems may also incorporate simple physics-based modeling to predict future states of such objects when determining how to traverse the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
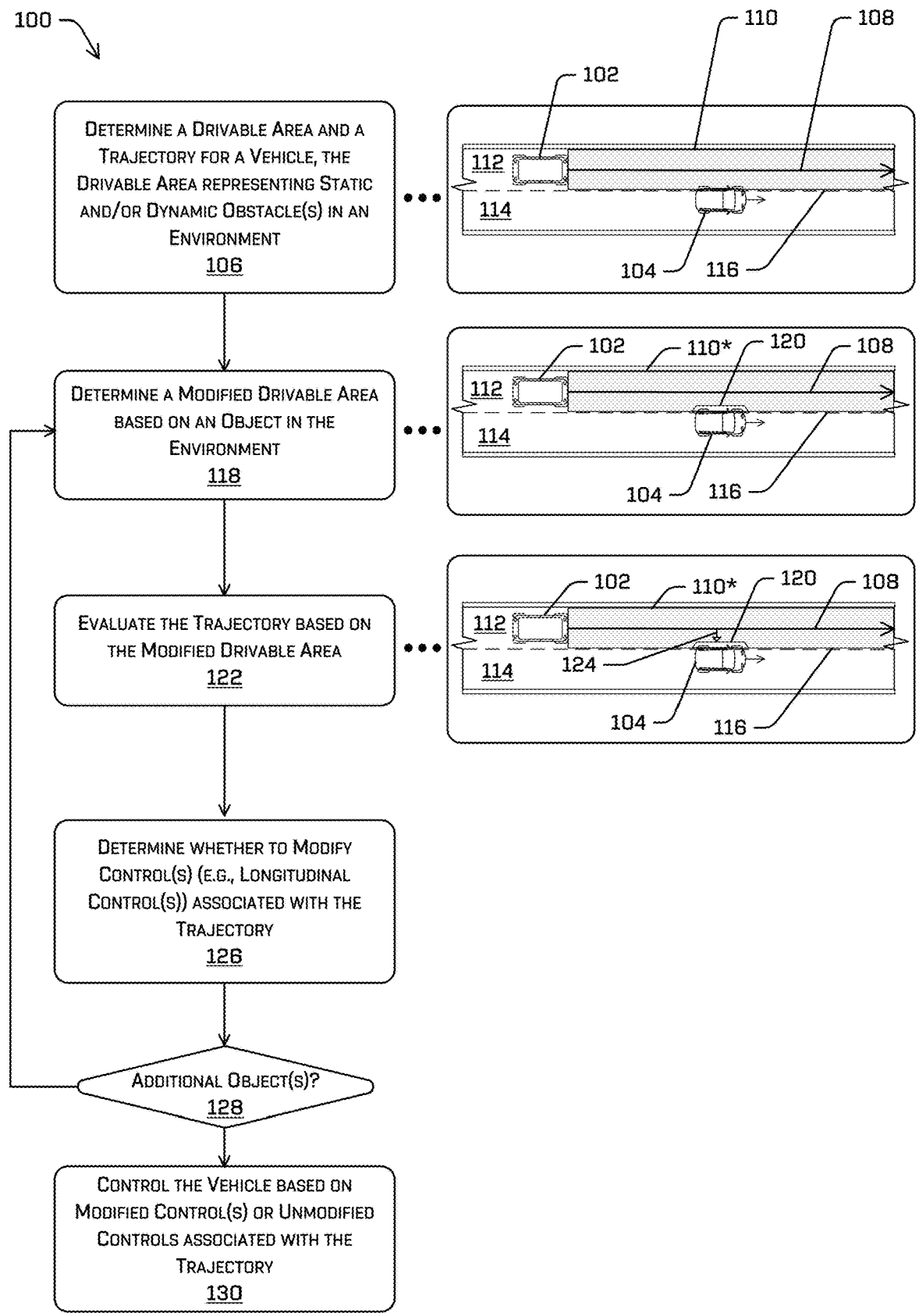
FIG. 1 is a schematic diagram illustrating an example implementation of determining whether to follow an object, as described herein.

Techniques described herein are directed to determining, for an autonomous vehicle (hereinafter "vehicle"), whether to follow an object. Such a determination may include determining whether an object is or will be within a threshold distance of the vehicle at a point along a trajectory generated by the vehicle. For example, the vehicle can generate a drivable area representing a region of the environment in which the vehicle can traverse. The vehicle can capture sensor data of the environment, which may represent an object such as another vehicle in an adjacent lane or otherwise proximate to the vehicle. The drivable area can be updated to reflect a current or predicted position of the object, and the operations can include determining, for various points along the trajectory generated by the vehicle, whether the current or predicted location of the object is within a threshold distance of the trajectory. If the object encroaches on the trajectory (e.g., based on distance threshold(s) and/or cost(s)), the vehicle can determine to follow the object. Following may involve varying longitudinal controls of the vehicle (e.g., velocity and/or acceleration) to maintain a minimum distance between the vehicle and the object, wherein the minimum distance may be based, at least in part, on a relative distance and/or velocity between the vehicle and the object.

An object may, for example, be located in or relatively near a drivable area in which the autonomous vehicle can travel in an environment. In an example, the object may be just beginning to merge from an adjacent lane into the lane of the drivable area.

In various implementations, the vehicle may perform a "spot check" of one object at a time to determine whether or not to follow one of the objects. Such a spot check may be a relatively fast process by generally avoiding additional use of a processor for more detailed calculations, such as those involving predicting motions of the one or more objects, determining possible trajectories based on the predicted motions, and so on. Instead, a spot check may involve individually considering (e.g., "fusing" in) one object at a time with respect to the drivable area. For each such object, a reference trajectory (e.g., a lateral plan of the current or latest trajectory) may be checked (e.g., considered or compared) against a computed candidate drivable area. As noted above, if the reference trajectory intersects the candidate drivable area or is within a threshold distance of a boundary of the candidate drivable area (or, in other embodiments, a cost associated with the newly computed candidate drivable area is relatively high), the vehicle may choose to follow the object. In this case of following, the newly computed candidate drivable area can be used to subsequently modify the trajectory. On the other hand, in the case of no intersection and thus no following, the newly computed candidate drivable area is used merely as a "spot check" measurement and subsequently discarded. Such spot checks of each individual object in an environment may subsequently be used to inform a controller.

Based on a decision of whether to follow the object, a computing device of the autonomous vehicle may determine to construct and subsequently modify the drivable area by considering a plurality of various dynamic and/or static objects and/or predictions of how such objects will operate in the environment. A non-limiting list of objects may include obstacles in an environment, including but not limited to pedestrians, animals, cyclists, trucks, motorcycles, other vehicles, or the like. In at least one example, a drivable area is a virtual representation in the environment that generally defines the constraints and/or boundaries within which a vehicle can safely travel relative to the objects and obstacles to effectively reach an intended destination. In some examples, the drivable area is determined by computing device(s) on an autonomous vehicle and can be utilized by those computing device(s) to navigate the autonomous vehicle in the environment. That is, the computing device(s) onboard the autonomous vehicle can determine trajectories based on the extents of the drivable area.

Generally, a drivable area may be determined as a virtual space in the environment in which the vehicle can travel. The drivable area may include boundaries that provide offsets from the objects, which may be determined based on semantic properties of the object(s), probabilistic models (including models of the motion of objects, sensor measurements, and the like), rules of the road (e.g., incorporating lane boundaries, sidewalks, and the like) or other information. In at least some examples, discrete portions (e.g., every 10 cm, 50 cm, 1 m, etc.) along the drivable area boundaries may be encoded with additional information, such as, but not limited to, distance to the nearest object, semantic classification of the nearest object, uncertainties (e.g., based on sensor noise), confidences, etc. Moreover, in some implementations, more than one drivable area may be determined. For example, much like real world drivers may have multiple options for avoiding an object, e.g., pass on the right or pass on the left on a three-lane road, multiple drivable areas may be determined for more than one potential planned path. In these examples, one drivable area is selected for implementation. For example, a drivable area may be preferred because it has a larger area, because it better conforms to traffic laws (e.g., pass a vehicle on the left instead of the right), because it avoids the most objects, or for one or more additional reasons.

As a non-limiting example, a computing device of an autonomous vehicle may receive sensor data and detect one or more objects in an environment and/or determine attributes or object parameters of the one or more objects in the environment. Object parameters may comprise velocity, acceleration, position, classification, and/or extents of each of the one or more objects, in addition to any uncertainty information associated therewith. Sensor data captured by the autonomous vehicle may include light detection and ranging (LIDAR) sensor data, radio detection and ranging (RADAR) sensor data, sound navigation and ranging (SONAR) sensor date, image data, time of flight data, and the like. In some cases, sensor data may be provided to a perception system configured to determine a type of object (e.g., vehicle, pedestrian, bicycle, animal, parked car, tree, building, and the like) in the environment. Further, the perception system can determine, based on the sensor data, movement information about the object in the environment.

In some instances, the computing device of the autonomous vehicle can utilize the object(s) and/or the attributes of the object(s) to determine which object(s) should be considered when determining a drivable area, to determine extents of the drivable area, and/or to determine a trajectory, or modify an existing trajectory, to navigate the autonomous vehicle in the drivable area. In some examples, whether to modify a drivable area and/or trajectory can be determined, at least in part, by considering one or more costs and/or constraints associated with vehicle dynamics of a predicted trajectory.

In some implementations, the computing device(s) on an autonomous vehicle may determine, or modify, a drivable area by fusing or including data about a number of objects in the environment. For example, the computing device(s) may determine a trajectory that navigates through the environment relative to one or more objects. At discrete points (or line segments at discrete points) along the trajectory, the computing device(s) may then determine lateral distances (for example) from the trajectory to the objects. For example, the computing device(s) may use ray casting techniques to determine the lateral distances at poses of a vehicle along the trajectory. Based on these distances and information about the object(s), a modified trajectory may then be determined. For example, the computing device(s) may use semantic information about the objects to classify the objects and determine a safety factor or safety level associated therewith. In some instances, a minimum offset distance of the vehicle from an object, or a safety margin, may be associated with each safety level. The computing device(s) may also use probabilistic information about the objects to determine the safety level and/or the offset distance of the vehicle relative to the object. For instance, the computing device(s) may apply probabilistic filtering to the distance determinations, for example, to account for uncertainty associated with the lateral distances. For instance, uncertainty may be associated with the measurements, e.g., with calibration and/or tolerances of sensors and/or sensor components, with motion of the sensed objects, e.g., uncertainty associated with potential future movement of objects or prediction models that characterize the movement, or the like.

In some implementations, a cost or constraint may be used, for example, to enforce safe driving conditions and/or physical correctness (e.g., to ensure that a trajectory follows a physically plausible trajectory). In some cases, a trajectory can be determined by interpolating between points, which are determined by processes described below, or fitting a curve to the points (e.g., fitting one or more of a polynomial curve, a Bezier curve, a clothoid curve, etc.). In some cases, generating or modifying a trajectory and/or selecting the points can be based at least in part on one or more costs and/or constraints associated with vehicle dynamics to prevent or reduce an occurrence where the trajectory could lead to risky or unsafe driving conditions or represents an unreasonable trajectory (e.g., involving "teleportation" of the vehicle where subsequent points comprise physically impossible motion of the vehicle). Examples of such costs may include, but are not limited to, a velocity cost (e.g., a constant velocity cost), an acceleration cost, an expectation that the object may follow rules of the road, and the like.

For example, generally a drivable area (e.g., drive corridor/envelope) is determined based on objects in the environment. In some examples, such objects may represent static objects (e.g., parked cars, buildings, pylons, etc.). In other examples, such objects may additionally, or alternatively, include dynamic objects which would not impact driving within a lane (e.g., vehicles behind the autonomous vehicle, oncoming vehicles, and the like). A trajectory constrained to the drivable area is subsequently generated. In response to an object (e.g., a second vehicle in an adjacent lane) entering the drivable area of the vehicle (and/or a prediction of such an event), the drivable area may be modified in a "spot-checking" operation. A comparison (e.g., via the spot check) between the modified (e.g., most-updated) drivable area and the latest trajectory may determine whether the object is to be followed or not. In the case of a determination to follow, the trajectory may be modified based on the comparison. Otherwise, the trajectory need not be modified, at least not in response to the action of the object thus far. In other words, if the object is not to be followed, the drivable area and/or trajectory may be maintained and the vehicle will continue on the current trajectory.

In some examples, once a modified drivable area is established, the computing device of the autonomous vehicle may determine whether to generate one or more new trajectories for proceeding within the drivable area. Thus, for example, the drivable area may define boundaries of a region in which the vehicle may travel, and the trajectories may be discrete segments within the drivable area according to which the vehicle will travel. Thus, for example, while the drivable area may be calculated using a planned path through the environment, the trajectories may be discrete, shorter segments intended to be carried out by the vehicle to traverse through the environment, within the drivable area.

Techniques described herein are directed to leveraging sensor and perception data to enable a vehicle, such as an autonomous vehicle, to navigate through an environment while following or circumventing objects in the environment. For example, one or more trajectories can be generated based on prediction probabilities and such trajectories may be provided to a planner system to control an operation of the autonomous vehicle In some examples, a prediction system of a computing device of the autonomous vehicle can include a machine learning model trained to output data that can be used to generate one or more predicted trajectories of objects proximate to the autonomous vehicle. For example, the machine learning model can output coordinates (e.g., x-coordinates and y-coordinates) associated with the object (e.g., a third-party vehicle) at one or more times in the future (e.g., 1 second, 2 seconds, 3 seconds, etc.). In some examples, the machine learning model can output coordinates associated with the object as well as probability information associated with each coordinate. In some examples, such probability information can be represented as an ellipse or other polygon associated with a threshold probability level (e.g., a 65% probability that a location of the object at a particular time is within the area represented by the ellipse). A predicted trajectory can be generated by interpolating between the coordinates output by the machine learning model. In some examples, the machine learning model can include a convolutional neural network (CNN), which may include one or more recurrent neural network (RNN) layers, such as, but not limited to, long short-term memory (LSTM) layers. In some examples, the machine learning model can output a heat map associated with prediction probabilities. In some examples, at least one predicted trajectory can be determined based at least in part on the heat map.

Techniques described herein can provide a robust framework for determining whether to follow an object in an environment. Techniques described herein may be faster than conventional techniques by performing a geometric or cost-based check based on incorporating object extents into the drivable area of the vehicle. In some cases, quickly determining to follow a vehicle may allow a planning system to alter a trajectory of the vehicle (e.g., by slowing down) which may improve safety outcomes (e.g., by maintaining a minimum distance between the vehicle and the object) and/or by improving passenger comfort (e.g., by slowly decelerating rather than braking to adjust a velocity of the vehicle)

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In another example, the techniques can be utilized in an aviation or nautical context. Additionally, the techniques described herein can be used with real data (e.g., captured using sensor(s)), simulated data (e.g., generated by a simulator), or any combination of the two.

FIGS. 1-5 provide additional details associated with techniques described herein.

FIG. 1 is a pictorial flow diagram showing example processes involved during a determination of whether or not a vehicle is to follow an object, as described herein. Specifically, FIG. 1 illustrates a process 100 performed by a vehicle 102 in which an object 104 in an environment is considered in a determination of whether to create modified controls for the vehicle. In the specific example, object 104, such as a vehicle, may be in an adjacent lane and merging into the path or lane of vehicle 102. This situation, among others, may lead to a determination as to whether or not to follow object 104. A modified drivable area may subsequently be used to determine and/or modify a trajectory through the environment, e.g., so vehicle 102 can travel through the environment along the trajectory. A modified trajectory is associated with vehicle 102 following object 104 while an unmodified trajectory is associated with not following object 104. In an example where the object 104 is directly in front of vehicle 102, the drivable area is modified so that the drivable area does not include object 104, and a resulting modified trajectory would lead to vehicle 102 following object 104.

The processes illustrated in FIG. 1 are not limited to being performed using vehicle 102 and can be implemented using any of the other vehicles described in this application, as well as vehicles other than those described herein. Moreover, vehicle 102 described herein is not limited to performing the processes illustrated in FIG. 1.

Process 100 is illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, process 100 can be combined in whole or in part with other processes.

At block 106, vehicle 102, via operations implemented in hardware, software, or a combination thereof, determines a drivable area and a trajectory in an environment. The drivable area may have been previously determined based on positions/locations of one or more static obstacles (e.g., lane boundaries, curbs, sidewalks, parked cars, etc.) and/or dynamic obstacles (e.g., oncoming traffic, etc.) in the environment. As illustrated, vehicle 102 is following a trajectory 108 in a drivable area 110. Vehicle 102 is travelling in a lane 112 and object 104 (e.g., another vehicle) is travelling in an adjacent lane 114. The two lanes are bounded by a partition 116, which may be a paint stripe or Botts' dots (e.g., raised pavement markers), though partition 116 need not comprise any markers in some implementations. Drivable area 110 may be generated based on static and/or dynamic objects in the environment. In some implementations, the size and geometry of drivable area 110 may be determined (and resultingly may include "cut-outs" (not illustrated in FIG. 1) that are areas removed from drivable area 110) based on considerations of special objects in the environment, such as emergency-response vehicles, oncoming traffic, crossing traffic, and so on. In other words, such special objects may dictate that various parts of drivable area otherwise determined based on other objects are not acceptable and should be removed for the "final" version of the drivable area.

At block 118, vehicle 102, via operations implemented in hardware, software, or a combination thereof, determines a modified drivable area based on actions and/or position of object 104. Such a determination may be based on sensor data associated with object 104 and received by vehicle 102. In the example situation depicted in FIG. 1, object 104 performs an action of changing, drifting, and/or merging into lane 114 from lane 112, resulting in a lane intrusion. This action may prompt vehicle 102 to determine a modified drivable area 110*, which may include a "cut-out" or removal of a portion 120 of drivable area 110. In other implementations, vehicle 102 may determine a modified drivable area 110* in response to merely the proximity of object 104 to vehicle 102, regardless of the action of object 104. In yet other implementations, described below, vehicle 102 may determine a modified drivable area 110* based, at least in part, on costs associated with object 104. In still other implementations, described below, vehicle 102 may determine a modified drivable area 110* based, at least in part, on predicted behavior of object 104. The process of block 118 may be performed one at a time for additional nearby objects (not illustrated in FIG. 1).

As described below, vehicle 102 can include a sensor system(s) such as LIDAR sensors, RADAR sensors, ultrasonic transducers, SONAR sensors, time of flight sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. A sensor system(s) can provide input to vehicle computing device(s) and one or more systems of vehicle computing device(s) can utilize the input. For instance, in at least one example, vehicle computing device(s) can receive the input for processing by a localization system, perception system, prediction system, planner system, and/or drivable area determination system.

In at least one example, vehicle 102 can send sensor data to computing device(s) via network(s). In some examples, vehicle 102 can send raw sensor data to computing device(s). In other examples, vehicle 102 can send processed sensor data and/or representations of sensor data to computing device(s) (e.g., data output from a localization system, perception system, prediction system, and/or planner system). In some examples, vehicle 102 can send sensor data to computing device(s) at a particular frequency, after a lapse of a predetermined period of time, in near real-time, etc. Sensor data collected over time can correspond to log data.

At block 122, vehicle 102, via operations implemented in hardware, software, or a combination thereof, evaluates the trajectory of vehicle 102 based on the modified drivable area. In some cases, the operations may include evaluating at discrete timesteps or points along the trajectory 108 a state of the environment, which may be referred to as a "rollout". Such evaluating may include updating a position of the vehicle 102 and/or the object 104 as anticipated over time. Such an evaluation is part of a technique for determining whether object 104 affects the trajectory by determining whether the modified drivable area, based on object 104, requires a new trajectory. For example, if object 104 moves substantially into lane 112, drivable area 110 would need to be modified. Even in this situation, trajectory 108 may not have to be modified if, for instance, there remains a lateral clearance 124 that is safe and significant (e.g., with respect to a threshold value based on a velocity of the vehicle 102 and/or the object 104, a classification of the object 104, location of the vehicle 102 in a map, and the like) between trajectory 108 and object 104. In this case, vehicle 102 may pass object 104 (or otherwise continue following the trajectory 108), thus choosing not to follow object 104.

At block 126, vehicle 102 determines whether to modify control(s) associated with trajectory 108. For example, as described above, such determining may be based on whether object 104 affects trajectory 108. In some examples, such a determination may be made geometrically (e.g., does the trajectory 108 intersect a boundary of the drivable area 110 and/or within a predetermined distance thereof). In additional, or alternate, examples, such a determination may comprise determining various costs associated with following the trajectory given the updated or modified drivable area 110*. For example, such costs may be based at least in part on trip parameters associated with the trajectory. In some implementations, trip parameters may comprise one or more of accident risk factors and vehicle dynamics (e.g., which may be used to determine a safe stop trajectory for safely and comfortably slowing down (or stopping)). Cost or trip parameters may also include data associated with minimum distances to maintain between the vehicle and the object. Other trip parameters may include vehicle dynamics, passenger comfort, estimated time of arrival, and energy usage, just to name a few examples.

At block 128, objects in addition to object 104 may be included and considered, one at a time (and/or substantially simultaneously and independently), in blocks 118, 122, and 126 of process 100. In this way, information about each object may be fused or combined with drivable area 110 individually and checked against a reference line (e.g., trajectory 108) to determine whether or not to follow (e.g. control according to a longitudinal velocity). As described above, a number of objects may be present in an environment in which an autonomous vehicle is travelling. Such objects may include vehicles and pedestrians. Based on sensor data, vehicle computing devices may recognize the objects, e.g., via image processing, vision detection, classification and/or segmentation, LIDAR detection, segmentation, and/or classification, and/or other processes.

At block 130, vehicle 102 is controlled based on modified control(s) associated with a modified trajectory so that vehicle 102 is following object 104. Alternatively, vehicle 102 is controlled based on unmodified controls associated with (unmodified) trajectory 108 so that vehicle 102 is not following object 104.

Figure 2:
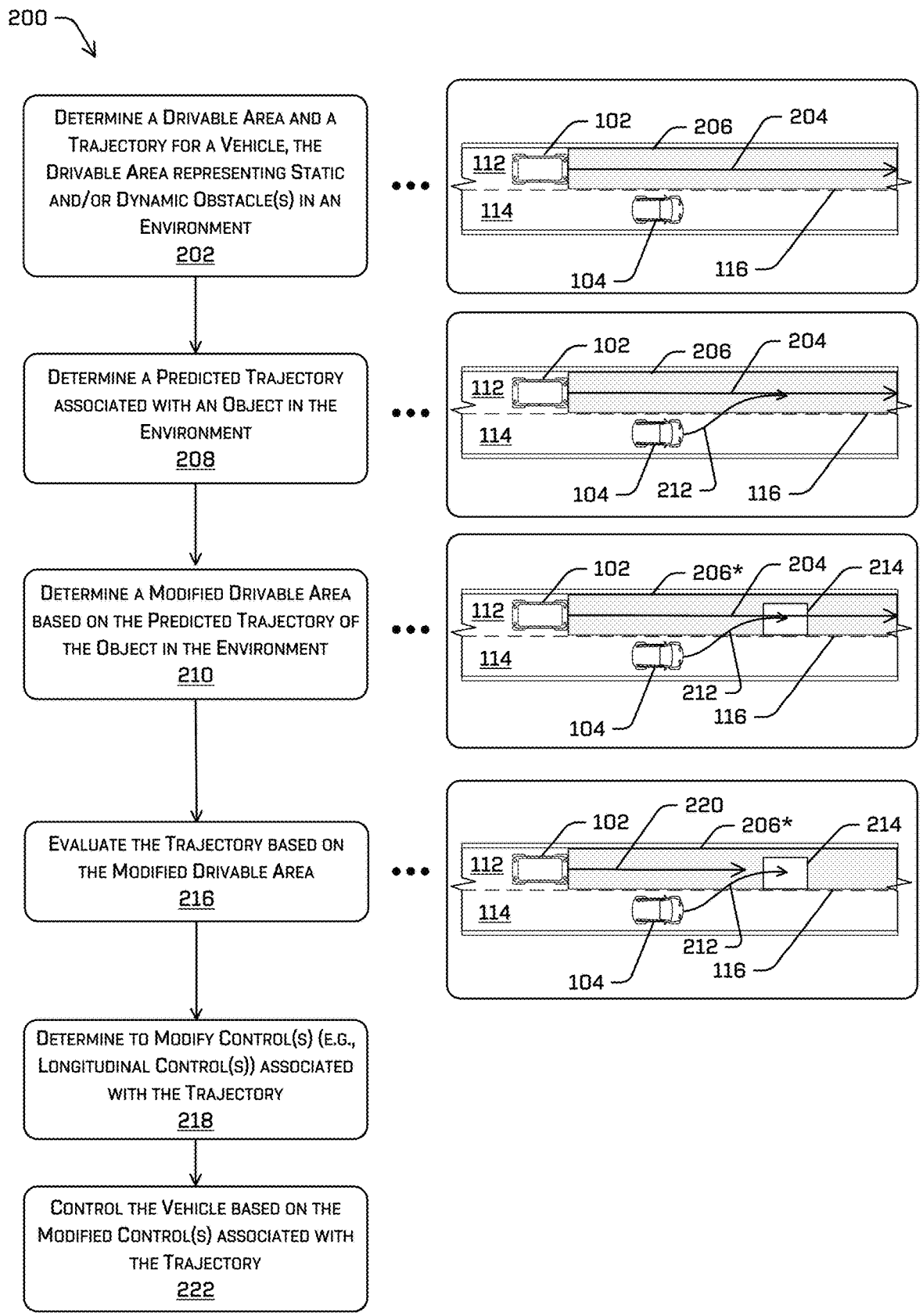
FIG. 2 is a schematic diagram illustrating another example implementation of determining whether to follow an object, as described herein.

FIG. 2 is a pictorial flow diagram showing example processes involved during a determination of whether or not a vehicle is to follow an object based on predicted behavior of the object, as described herein. Specifically, FIG. 2 illustrates an environment similar to that of FIG. 1, but another process 200 is performed by vehicle 102. Process 200 includes determining whether to create a modified drivable area for vehicle 102 based on predictions of actions performed by object 104. In the specific example, object 104 may be in an adjacent lane and just beginning (or demonstrating some indication of intent) to merge into the path or lane of vehicle 102. This situation, among others, may lead to a determination as to whether or not to follow object 104. A modified drivable area may subsequently be used to determine and/or modify a trajectory through the environment, e.g., so vehicle 102 can travel through the environment along the trajectory. A modified trajectory is associated with vehicle 102 following object 104 while an unmodified trajectory is associated with vehicle 102 not following object 104.

As for process 100 above, process 200 is illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, process 200 can be combined in whole or in part with other processes.

At block 202, vehicle 102, via operations implemented in hardware, software, or a combination thereof, determines a drivable area and a trajectory in an environment. The drivable area may have been previously determined based on positions/locations of one or more static or dynamic obstacles in the environment. As illustrated, vehicle 102 is following a trajectory 204 in a drivable area 206. Vehicle 102 is travelling in lane 112 and object 104 (e.g., another vehicle) is travelling in adjacent lane 114. The two lanes are bounded by partition 116, which may be a paint stripe or Botts' dots (e.g., raised pavement markers), though partition 116 need not comprise any markers in some implementations. Drivable area 206 may be generated based on static and/or dynamic objects in the environment.

At block 208, vehicle 102, via operations implemented in hardware, software, or a combination thereof, determines a predicted trajectory associated with object 104. A predicted motion of the object may be used to determine a likelihood that object 104 will cut in front of vehicle 102, which could affect and/or potentially interfere with operation of vehicle 102. For example, a lane change by object 104 may require vehicle 102 to decelerate to make room for object 104 to follow the object. This situation would involve modifying drivable area 206 of vehicle 102. In particular, at block 210, vehicle 102, via operations implemented in hardware, software, or a combination thereof, determines a modified drivable area based on the predicted trajectory of object 104. In the example situation depicted in FIG. 2, vehicle 102 predicts a trajectory 212 from a predicted likelihood (which, for example, may exceed a predetermined threshold) that object 104 will drift and/or merge into lane 114 from lane 112, resulting in a lane intrusion. This predicted trajectory of object 104 may prompt vehicle 102 to determine a modified drivable area 206*, which may include a "cut-out" or removal of a portion 214 of drivable area 206. In some implementations, vehicle 102 may determine a plurality of predicted trajectories for object 104, and each one of these predicted trajectories may be associated with a likelihood value. Vehicle 102 may determine a modified drivable area 206* based on the predicted trajectory having the highest likelihood value, for example (e.g., in those examples where multiple predicted trajectories for such an object are determined), though any predicted trajectory may be used and/or an uncertainty or probability of such a trajectory. The process of blocks 208 and 210 may be performed one at a time for additional nearby objects (not illustrated in FIG. 2) and/or substantially simultaneously and independently.

Vehicle 102 may predict behavior of object 104 (and other objects) based on data gathered by a sensor system(s) such as that described above. Such a sensor system(s) can provide input to vehicle computing device(s) and one or more systems of vehicle computing device(s) can utilize the input. For instance, in at least one example, vehicle computing device(s) can receive the input for processing by a localization system, perception system, prediction system, planner system, and/or drivable area determination system.

At block 216, vehicle 102, via operations implemented in hardware, software, or a combination thereof, evaluates trajectory 204 of vehicle 102 based on the modified drivable area 206* (which in turn may have been modified based on predicted trajectory 212 of object 104). In some cases, the operations may include evaluating at discrete timesteps or points along the trajectory 204 a state of the environment, which may be referred to as a "rollout". Such evaluating may include updating a position of the vehicle 102 and/or the object 104 as anticipated over time (e.g., based on controls associated with the vehicle 102 and/or based on expected positions, accelerations, velocities, etc. associated with the predicted trajectory 204). Such an evaluation is part of a technique for determining whether object 104 affects trajectory 204 by determining whether the modified drivable area 206*, based on object 104, requires a new trajectory (e.g., to replace trajectory 204). For example, if predicted trajectory 212 of object 104 intersects or comes within a predetermined threshold distance of trajectory 204 of vehicle 102, then the trajectory 204 and/or the drivable area 206 would need to be modified. In additional or alternative examples, costs associated with the trajectory 204 with respect to the modified drivable area 206* may be determined.

At block 218, vehicle 102 determines whether to modify control(s) of vehicle 102 associated with trajectory 204. For example, as described above, such determining may be based on whether object 104 affects trajectory 204. In the example depicted in FIG. 2, predicted trajectory 212 of object 104 leads to object 104 being directly in front of vehicle 102 and, in some timesteps, occupying a portion of the environment associated with the trajectory 204. This situation may result in vehicle 102 generating a modified trajectory 220 (e.g., which replaces trajectory 204), to follow object 104.

As in FIG. 1, such a determination may be made with respect to geometry (whether the trajectory 204 intersects and/or comes within a threshold distance of the modified drivable area 206*) and/or by reevaluating various costs associated with the modified drivable area 206*. For example, such costs may be based at least in part on trip parameters associated with the trajectory. In some implementations, trip parameters may comprise one or more of functions of distances to boundaries (e.g., parabolic, polynomial, exponential, etc.), vehicle speed, changes in vehicle acceleration, following distances, accident risk factors and vehicle dynamics (e.g., which may be used to determine a safe stop trajectory for safely and comfortably slowing down (or stopping)), and the like. Cost or trip parameters may also include data associated with minimum distances to maintain between the vehicle and the object. Other trip parameters may include vehicle dynamics, passenger comfort, estimated time of arrival, and energy usage, just to name a few examples.

At block 222, vehicle 102 is controlled based on modified controls associated with a modified trajectory so that vehicle 102 is following object 104. Alternatively, in the case where predicted trajectory 212 of object 104 does not intersect or interfere with trajectory 204 of vehicle 102, vehicle 102 is controlled based on unmodified controls associated with (unmodified) trajectory 108 so that vehicle 102 is not following object 104.

As will be appreciated, as vehicle 102 moves through the environment, objects in the environment are ever-changing. Accordingly, processes 100 and 200 may be carried out iteratively. For example, new drivable areas may be determined in near real-time, e.g., at intervals of from about 0.5 seconds to about 3 seconds or so. Moreover, as objects change positions, velocities, attitudes, and the like, relative to the vehicle, the drivable area can be updated to include new information about the object. Moreover, each drivable area may be based on a propagation of predicted motion, e.g., of the vehicle and/or of the object(s). Thus, for example, the position along the path at which the lateral distances are determined may include an approximation of where objects will be when the vehicle is at a position associated with a trajectory.

Figure 3:
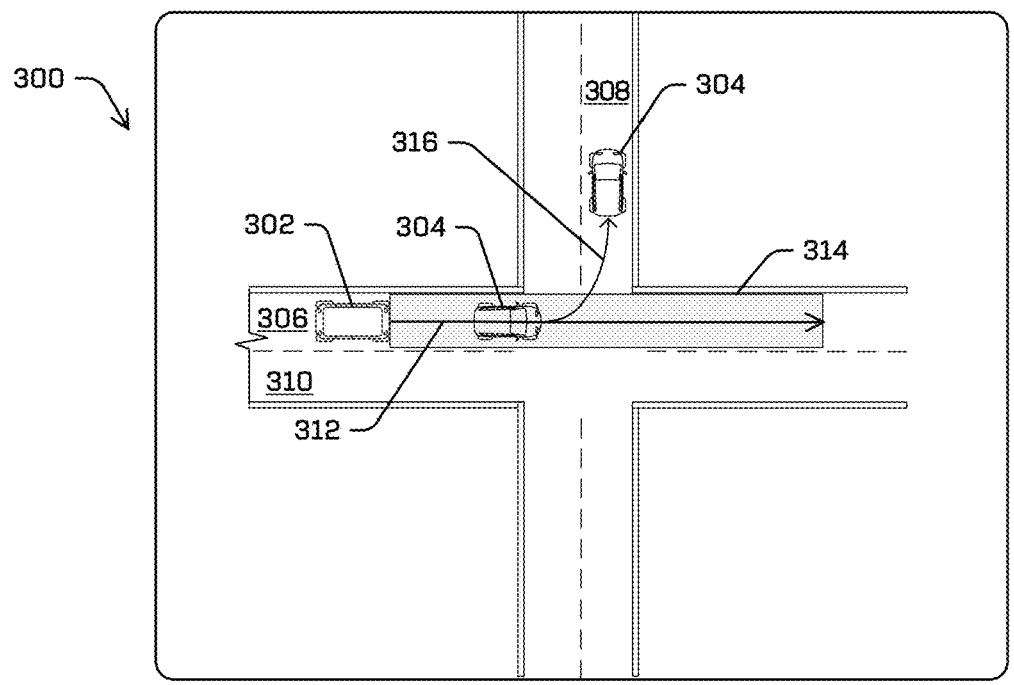
FIGS. 3 and 4 are schematic diagrams illustrating example implementations of determining whether to follow an object, as described herein.

FIG. 3 is a schematic diagram illustrating an example implementation 300 of a vehicle 302 at an intersection determining whether to follow an object 304. Specifically, FIG. 3 illustrates vehicle 302 behind (e.g., following) object 304, both travelling in a lane 306 and approaching an intersection. As depicted in the figure, object 304 is turning left into a lane 308 of an intersecting street. Prior to the depicted situation, vehicle 302 may have been behind object 304 for a while or, alternatively, object 304 may have just entered lane 306 from a right lane 308 preparing to make the left turn, thus pulling in front of (e.g., cutting off) vehicle 302. Such a turn may lead to two, among other, situations. In a first situation, for example, object 304 may substantially slow down or stop during or prior to making the turn from lane 306 to lane 308. In a second situation, object 304 may substantially maintain its speed during the complete process of the turn. In either situation, vehicle 302 may perform a process of determining whether or not to follow object 304 up until object 304 turns. For example, in the first situation, an action of following object 304 implies that vehicle 302 slows down concomitant with the slowing down of object 304, so that a safe distance between the vehicle and object is maintained. Alternatively, in the first situation, an action of not following object 304 implies that vehicle 302 passes object 304 via right lane 310. In the second situation, an action of following object 304 implies that vehicle 302 maintains its speed with the expectation that the object 304 may turn out of the lane 306 to the lane 308. Alternatively, in the second situation, an action of not following object 304 implies that vehicle 302 passes object 304 via a right lane 310.

In various implementations, vehicle 302 may perform a "spot check" of object 304 to determine whether or not to follow the object. As described above, such a spot check may be a relatively fast process by generally avoiding additional use of a processor for more detailed calculations, such as those involving determining detailed cost(s) or predicting motions of the object, determining possible trajectories based on the predicted motions, and so on. Instead, the spot check may involve evaluating and comparing a lateral plan of the current or latest trajectory 312 of a drivable area 314 of vehicle 302 against a trajectory of a newly computed modified drivable area of vehicle 302. Note that drivable area 314 is indicative of the latter situation above, where object 304 has suddenly pulled in front of vehicle 302. If the reference trajectory 312 intersects (or, in other embodiments, a cost associated with the such a trajectory with reference to the newly computed modified drivable area is relatively high), vehicle 302 may choose to follow object 304. In this case of following, the newly computed modified drivable area 314 is used to modify the trajectory of vehicle 302. On the other hand, in the case of no intersection and thus no following, the newly computed candidate drivable area is used merely as a "spot check" measurement and subsequently discarded. In some implementations, vehicle 302 may modify drivable area 314 based on a predicted trajectory 316 of object 304, as described above. Alternatively, if the vehicle 302 determines that the object 304 will turn out of the lane 306 into lane 308, the vehicle 302 may maintain a velocity which may reduce a distance between the vehicle 302 and the object 304 which might otherwise be associated with a "brake tap" to slow the vehicle 302 down. That is, in some cases, determining that the object 304 may turn out of a drivable area 314 based on a predicted trajectory 316 may reduce decelerations, thereby improving ride comfort and/or conserving vehicle energy resources.

Figure 4:
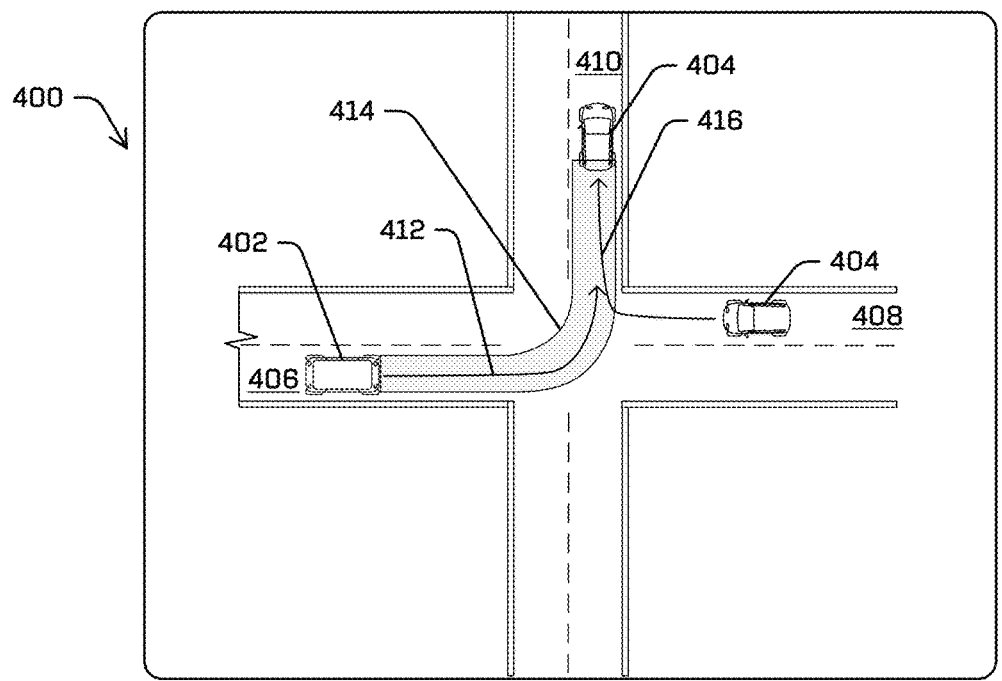

FIG. 4 is a schematic diagram illustrating an example implementation 400 of a vehicle 402 at an intersection determining whether to follow an object 404. Specifically, FIG. 4 illustrates vehicle 402 travelling in a lane 406 and approaching an intersection. As depicted in the figure, object 404 is in an oncoming lane 408 and turning right onto a lane 410 of the intersecting street. Vehicle 402 is also intending to turn into lane 410 (from lane 406). Such turns by vehicle 402 and object 404 may lead to two, among other, situations. In a first situation, for example, object 404 may substantially slow down or stop during or prior to making the turn from lane 408 to lane 410. In a second situation, object 404 may substantially maintain its speed during the complete process of the turn. In either situation, vehicle 402 may perform a process of determining whether or not to follow object 404 subsequent to turning. For example, in the first situation, an action of following object 404 implies that vehicle 402 slows down enough to allow object 404 to turn before vehicle 402 turns. And subsequent to both turns (of object 404 and of vehicle 402), following implies that a safe distance between the vehicle and object is maintained in lane 410. Alternatively, in the first situation, an action of not following object 404 implies that vehicle 402 does not yield to object 404 and turns onto lane 410 before object 404 turns onto lane 410. In the second situation, an action of following object 404 implies that vehicle 402 proceeds with the turn and maintains a safe distance behind object 404 in lane 410.

In various implementations, vehicle 402 may perform a spot check of object 404 to determine whether or not to follow the object. The spot check may involve evaluating and comparing a lateral plan of the current or latest trajectory 412 of vehicle 402 against a newly computed modified drivable area of vehicle 402. If the reference trajectory intersects (or, in other embodiments, a cost associated with the newly computed modified drivable area is relatively high), vehicle 402 may choose to follow object 404. In this case of following, the newly computed modified drivable area is used to modify the trajectory of vehicle 402. On the other hand, in the case of no intersection and thus no following, the newly computed candidate drivable area is used merely as a "spot check" measurement and subsequently discarded. In some implementations, vehicle 402 may modify drivable area 414 based on a predicted trajectory 416 of object 404, as described above.

Figure 5:
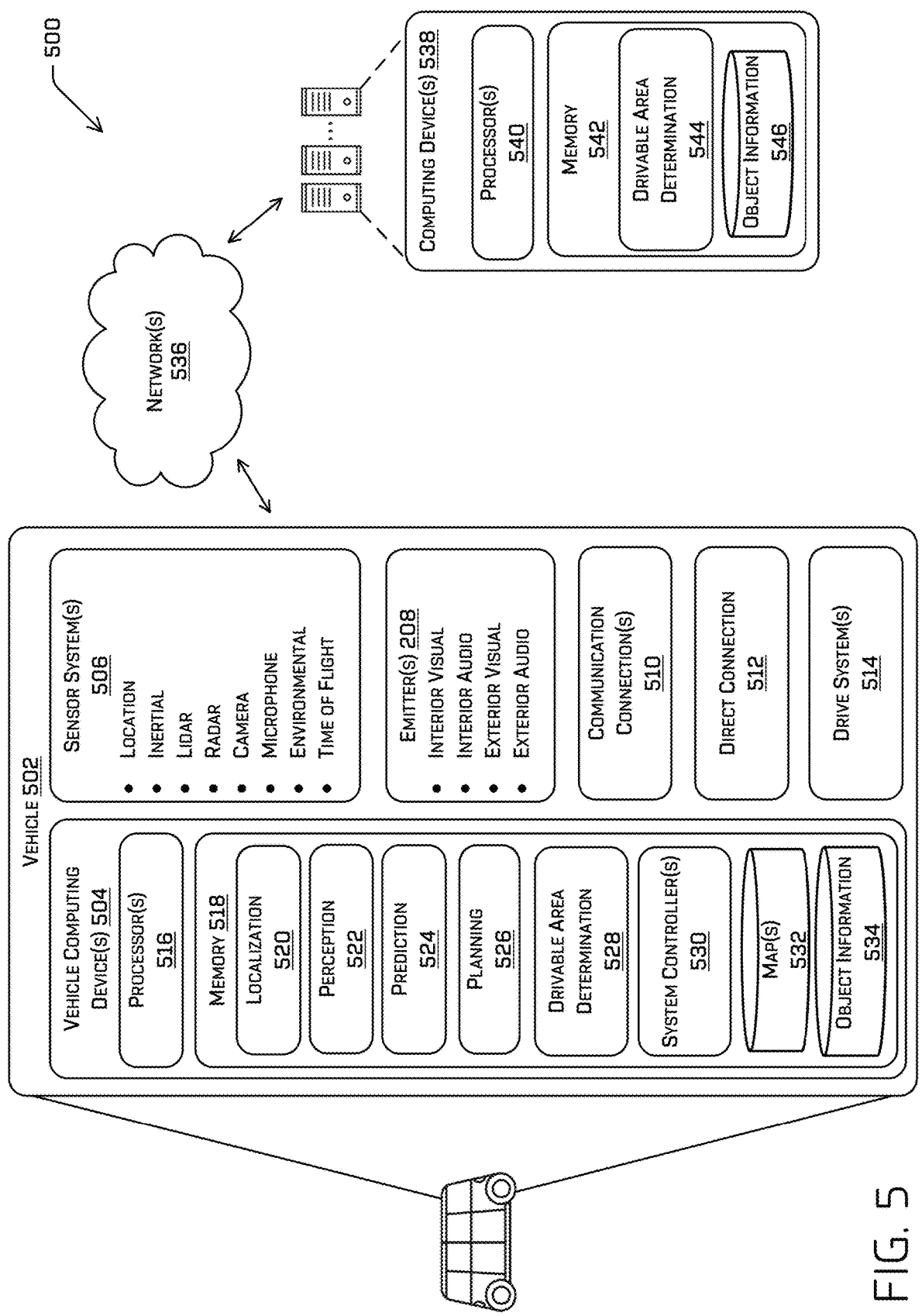
FIG. 5 is a block diagram illustrating an example computing system for generating a drivable area, as described herein.

FIG. 5 is a block diagram illustrating an example system 500 for generating and utilizing a drivable area as described herein. In at least one example, system 500 can include a vehicle 502, which can be the same vehicle as vehicles 102, 302, and 402 described above with reference to FIGS. 1-4. Vehicle 502 can include one or more vehicle computing devices 504, one or more sensor systems 506, one or more emitters 508, one or more communication connections 510, at least one direct connection 512, and one or more drive systems 514. In at least one example, sensor system(s) 506 can correspond to sensor systems described above.

Vehicle computing device(s) 504 can include processor(s) 516 and memory 518 communicatively coupled with processor(s) 516. In the illustrated example, vehicle 502 is an autonomous vehicle. However, vehicle 502 could be any other type of vehicle. In the illustrated example, memory 518 of vehicle computing device(s) 504 stores a localization system 520, a perception system 522, a prediction system 524, a planner system 526, a drivable area determination system 528, and one or more system controllers 530. Although these systems and components are illustrated, and described below, as separate components for ease of understanding, functionality of the various systems and controllers may be attributed differently than discussed. By way of non-limiting example, functionality attributed to perception system 522 may be carried out by localization system 520 and/or prediction system 524. Moreover, fewer or more systems and components may be utilized to perform the various functionalities described herein. Furthermore, though depicted in FIG. 5 as residing in memory 518 for illustrative purposes, it is contemplated that localization system 520, perception system 522, prediction system 524, planner system 526, drivable area determination system 528, and/or one or more system controllers 530 can additionally, or alternatively, be accessible to vehicle 502 (e.g., stored on, or otherwise accessible by, memory remote from vehicle 502).

As also illustrated in FIG. 5, memory 518 can include a map storage 532, which may store one or more maps, and/or object information storage 534, which may store object information. A map can be any number of data structures modeled in two dimensions or three dimensions that can provide information about an environment, such as, but not limited to, topologies (such as intersections), streets, mountain ranges, roads, terrain, and the environment in general.

In at least one example, localization system 520 can include functionality to receive data from sensor system(s) 506 to determine a position and/or orientation of vehicle 502 (e.g., one or more of an x-, y-, z-position, roll, pitch, or yaw). For example, localization system 520 can include and/or request/receive a map of an environment (e.g., from map storage 532) and can continuously determine a location and/or orientation of the autonomous vehicle within the map. In some instances, localization system 520 can utilize SLAM (simultaneous localization and mapping), CLAMS (calibration, localization and mapping, simultaneously), relative SLAM, bundle adjustment, non-linear least squares optimization, differential dynamic programming, or the like to receive image data, LIDAR data, RADAR data, IMU data, GPS data, wheel encoder data, and the like to accurately determine a location of the autonomous vehicle. In some instances, localization system 520 can provide data to various components of vehicle 502 to determine an initial position of an autonomous vehicle for generating a trajectory for travelling in the environment.

In some instances, perception system 522 can include functionality to perform object detection, segmentation, and/or classification. In some examples, perception system 522 can provide processed sensor data that indicates a presence of an object that is proximate to vehicle 502, such as objects 104, 304, and 404. The perception system may also include a classification of the entity as an entity type (e.g., car, pedestrian, cyclist, animal, building, tree, road surface, curb, sidewalk, unknown, etc.). For instance, perception system 522 may compare sensor data to object information in object information database 534 to determine the classification. In additional and/or alternative examples, perception system 522 can provide processed sensor data that indicates one or more characteristics associated with a detected object and/or the environment in which the object is positioned. In some examples, characteristics associated with an object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), a bounding box associated with the object, etc. Characteristics associated with the environment can include, but are not limited to, a presence of another object in the environment, a state of another object in the environment, a time of day, a day of a week, a season, a weather condition, an indication of darkness/light, etc.

Prediction system 524 can access sensor data from sensor system(s) 506, map data from map storage 532, and, in some examples, perception data output from perception system 522 (e.g., processed sensor data). In at least one example, prediction system 524 can determine features associated with the object based at least in part on the sensor data, the map data, and/or the perception data. As described above, features can include an extent of an object (e.g., height, weight, length, etc.), a pose of an object (e.g., x-coordinate, y-coordinate, z-coordinate, pitch, roll, yaw), a velocity of an object, an acceleration of an object, and a direction of travel of an object (e.g., a heading). Moreover, prediction system 524 may be configured to determine a distance between an object and a proximate driving lane, a width of a current driving lane, proximity to a crosswalk, semantic feature(s), interactive feature(s), etc.

Prediction system 524 can analyze features of objects to predict future actions of the objects. For instance, prediction system 524 can predict lane changes, decelerations, accelerations, turns, changes of direction, or the like. The prediction system 524 can send prediction data to drivable area determination system 528 so that drivable area determination system 528 can utilize the prediction data to determine the boundaries of the drivable area (e.g., based on one or more of an uncertainty in position, velocity, acceleration in addition to, or alternatively, with a semantic classification of the object). For instance, if the prediction data indicates that a pedestrian walking along the shoulder is behaving erratically, drivable area determination system 528 can determine an increased offset of the drivable area proximate the pedestrian. In some examples where vehicle 502 is not autonomous, prediction system 524 may provide an indication (e.g., an audio and/or visual alert) to a driver of a predicted event that may affect travel.

In some examples, prediction system 524 can include functionality to determine predicted point(s) representing predicted location(s) of an object in the environment. Prediction system 524, in some implementations, can determine a predicted point associated with a heat map based at least in part on a cell associated with a highest probability and/or based at least in part on cost(s) associated with generating a predicted trajectory associated with the predicted point.

For example, prediction system 524 can select a point, cell, or region of a heat map as a predicted point based at least in part on evaluating one or more cost functions associated with risk factors, safety, and vehicle dynamics, just to name a few examples. Such costs may include, but are not limited to, a positional-based cost (e.g., limiting a distance allowed between predicted points), a velocity cost (e.g., a constant velocity cost enforcing a constant velocity through the predicted trajectory), an acceleration cost (e.g., enforcing acceleration bounds throughout the predicted trajectory), an expectation that the object may follow rules of the road, and the like. In at least some examples, the probability associated with the cell may be multiplied with the cost (which, in at least some examples, may be normalized) such that the point (e.g., a candidate point) associated with the highest value of the cost times probability is selected as the predicted point associated with an object at a particular time.

In general, planner system 526 can determine a path for vehicle 502 to follow to traverse through an environment. For example, planner system 526 can determine various routes and trajectories and various levels of detail. For example, planner system 526 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, planner system 526 can generate an instruction for guiding the autonomous vehicle along at least a portion of the route from the first location to the second location. In at least one example, planner system 526 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for vehicle 502 to navigate. Thus, in example implementations described herein, planner system 526 may generate trajectories along which the vehicle can navigate, with the trajectories being contained within the drivable area.

Drivable area determination system 528 is configured to determine a drivable area, such as drivable area 110. Although illustrated as a separate block in memory 518, in some examples and implementations, drivable area determination system 528 may be a part of planner system 526. Drivable area determination system 528 can access sensor data from sensor system(s) 506, map data from map storage 532, object information from object information store 534, outputs from one or more of localization system 520, perception system 522, and/or prediction system 524 (e.g., processed data). By way of non-limiting example, drivable area determination system 528 may access (e.g., retrieve or receive) one or more planned paths. The planned paths may represent potential paths to navigate the environment, and may be determined based on map data, object information, and/or perception data, for example. In some examples, the planned paths may be determined as candidate paths for carrying out a mission. For instance, vehicle computing device(s) 504, may define or determine a mission as a highest-level of navigation to a destination, e.g., a series of roads for navigating to the destination. Once the mission is determined, one or more actions for carrying out that high-level navigation may then be determined. Actions may include more frequent determinations of how to carry out the mission. For example, actions may include tasks such as "follow vehicle," "pass vehicle on the right," or the like. In some examples, the projected paths described herein may be determined for each action.

For the planned path(s), drivable area determination system 528 may determine, at discrete points along the planned path(s), lateral distances from the path to objects in the environment. For example, the distances may be received as perception data generated by perception system 522, and/or may be determined using mathematical and/or computer vision models, such as ray casting techniques. Various lateral distances may then be adjusted to account for other factors. For example, it may be desirable to maintain a minimum distance between vehicle 502 and objects in the environment. In implementations of this disclosure, information about the objects, including semantic classifications, may be used to determine those distance adjustments. Moreover, prediction system 524 may also provide prediction data about a predicted movement of the objects, and the distances may further be adjusted based on those predictions. For example, the prediction data may include a confidence score and the lateral distance may be adjusted based on the confidence score, e.g., by making a greater adjustment for less confident predictions and slighter or no adjustments for more confident predictions. Using the adjusted distances, drivable area determination system 528 may define boundaries of the drivable area. In at least some examples, the boundaries may be discretized (e.g., every 10 cm, 50 cm, 1 m, etc.) and information regarding the boundary may be encoded (e.g., lateral distance to the nearest object, semantic classification of the nearest object, confidence and/or probability score associated with the boundary, etc.). As described herein, the trajectory determined by planner system 526 may be confined by, and in accordance with, in the drivable area. While drivable area determination system 528 is illustrated as being separate from planner system 526, one or more of the functionalities of drivable area system 528 may be carried out by planner system 526. In some embodiments, drivable area determination system 528 may be a part of planner system 526.

In at least one example, localization system 520, perception system 522, prediction system 524, planner system 526, and/or drivable area determination system 528 can process sensor data, as described above, and can send their respective outputs over network(s) 536, to computing device(s) 538. In at least one example, localization system 520, perception system 522, prediction system 524, and/or planner system 526 can send their respective outputs to computing device(s) 538 at a particular frequency, after a lapse of a predetermined period of time, in near real-time, etc.

In at least one example, vehicle computing device(s) 504 can include one or more system controllers 530, which can be configured to control steering, propulsion, braking, safety, emitters, communication, and other systems of vehicle 502. These system controller(s) 530 can communicate with and/or control corresponding systems of drive system(s) 514 and/or other components of vehicle 502. For example, system controllers 530 may cause the vehicle to traverse along a drive path determined by planner system 526, e.g., in a drivable area determined by drivable area determination system 528.

In at least one example, sensor system(s) 506 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), etc. sensor system(s) 506 can include multiple instances of each of these or other types of sensors. For instance, the LIDAR sensors can include individual LIDAR sensors located at the corners, front, back, sides, and/or top of vehicle 502. As another example, the camera sensors can include multiple cameras disposed at various locations about the exterior and/or interior of vehicle 502. sensor system(s) 506 can provide input to vehicle computing device(s) 504. Additionally and/or alternatively, sensor system(s) 506 can send sensor data, via network(s) 536, to computing device(s) 538 at a particular frequency, after a lapse of a predetermined period of time, in near real-time, etc.

Vehicle 502 can also include one or more emitters 508 for emitting light and/or sound. emitter(s) 508 in this example include interior audio and visual emitters to communicate with passengers of vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. Emitter(s) 508 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, emitter(s) 508 can be disposed at various locations about the exterior and/or interior of vehicle 502.

Vehicle 502 can also include communication connection(s) 510 that enable communication between vehicle 502 and other local or remote computing device(s). For instance, communication connection(s) 510 can facilitate communication with other local computing device(s) on vehicle 502 and/or drive system(s) 514. Also, communication connection(s) 510 can allow the vehicle to communicate with other nearby computing device(s) (e.g., other nearby vehicles, traffic signals, etc.). communications connection(s) 510 also enable vehicle 502 to communicate with a remote tele-operations computing device or other remote services.

Communications connection(s) 510 can include physical and/or logical interfaces for connecting vehicle computing device(s) 504 to another computing device or a network, such as network(s) 536. For example, communications connection(s) 510 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

In at least one example, vehicle 502 can include drive system(s) 514. In some examples, vehicle 502 can have a single drive system 514. In at least one example, if vehicle 502 has multiple drive systems 514, individual drive systems 514 can be positioned on opposite ends of vehicle 502 (e.g., the front and the rear, etc.). In at least one example, drive system(s) 514 can include sensor system(s) to detect conditions of drive system(s) 514 and/or surroundings of vehicle 502. By way of example and not limitation, sensor system(s) 506 can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, LIDAR sensors, RADAR sensors, etc. Some sensors, such as the wheel encoder(s) can be unique to drive system(s) 514. In some cases, the sensor system(s) 506 on drive system(s) 514 can overlap or supplement corresponding systems of vehicle 502 (e.g., sensor system(s) 506).

Drive system(s) 514 can include many of the vehicle systems, including a high voltage battery, a motor to propel vehicle 502, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, drive system(s) 514 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of drive system(s) 514. Furthermore, drive system(s) 514 also include communication connection(s) that enable communication by the respective drive module with other local or remote computing device(s).

As described above, vehicle 502 can send sensor data to computing device(s) 538 via network(s) 536. In some examples, vehicle 502 can send raw sensor data to computing device(s) 538. In other examples, vehicle 502 can send processed sensor data and/or representations of sensor data to computing device(s) 538 (e.g., data output from localization system 520, perception system 522, prediction system 524, and/or planner system 526). In some examples, vehicle 502 can send sensor data to computing device(s) 538 at a particular frequency after a lapse of a predetermined period of time, in near real-time, etc.

Computing device(s) 538 can receive sensor data (raw or processed) from vehicle 502 and/or one or more other vehicles and/or data collection devices and can determine a drivable area based on the sensor data and other information. In at least one example, computing device(s) 538 can include processor(s) 540 and memory 542 communicatively coupled with processor(s) 540. In the illustrated example, memory 542 of computing device(s) 538 stores a drivable area determination component 544 which can include object information storage 546, for example. In at least one example, the object information storage 546 can correspond to the object information storage 534 and/or the object information storage.

Drivable area determination component 544 may correspond to drivable area determination system 528 described above. For example, drivable area determination component 544 may process data to determine a drivable area remote from the vehicle. For example, the drivable area (or a preferred drivable area from a plurality of drivable areas) may be determined at computing device(s) 538 and transferred back to vehicle 502, e.g., via networks 536. Moreover, drivable area determination component 544 can perform one or more operations as described above and ascribed to localization system 520, perception system 522, prediction system 524, and/or planner system 526. In at least one example, drivable area determination component 544 can analyze the sensor data to determine attributes of objects in the environment to (1) determine whether such object(s) should be included in a drivable area and (2) configure boundaries of the drivable area. For example, drivable area determination component 544 may compare information about objects to classification information, e.g., stored in object information storage 546, to determine whether the object will be impacted by the vehicle, whether the object (or a predicted movement of the object) will impact the vehicle, and/or the extent to which the object should impact the drivable area.

Drivable area determination component 544 may also or alternatively consider features of objects to characterize the drivable area. Features can include an extent of an object (e.g., height, weight, length, etc.), a pose of an object (e.g., x-coordinate, y-coordinate, z-coordinate, pitch, roll, yaw), a velocity of an object, an acceleration of an object, a direction of travel of an object (e.g., a heading), a distance between an object and a proximate driving lane, a semantic classification of the object (car, pedestrian, bicyclist, etc.), a width of a current driving lane, proximity to a crosswalk, semantic feature(s), interactive feature(s), etc. In some examples, at least some of the features (e.g., the extent, the pose, etc.) can be determined by a perception system onboard a sensor data source (e.g., vehicle 502 and/or the other vehicle(s) and/or data collection device(s)) and other of the features can be determined based on such features and/or other sensor data and/or map data associated with a map of the environment. In some examples, a sample can be broken into one or more shorter periods of time and features can be determined for each of the shorter periods of time. The features for the sample can be determined based on a totality of features from each of the shorter periods of time.

Processor(s) 516 of vehicle 502 and processor(s) 540 of computing device(s) 538 can be any suitable processor capable of executing instructions to process data and perform operations as described herein. By way of example and not limitation, processor(s) 516 and 540 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 542 are examples of non-transitory computer-readable media. Memory 518 and 542 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of vehicle 502 can be associated with computing device(s) 538 and/or components of computing device(s) 538 can be associated with vehicle 502. That is, vehicle 502 can perform one or more of the functions associated with computing device(s) 538, and vice versa. Moreover, although various systems and components are illustrated as being discrete systems, the illustrations are examples only, and more or fewer discrete systems may perform the various functions described herein.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A. A method comprising: determining a drivable area through an environment for a vehicle, wherein the drivable area represents a region in the environment on which the vehicle may traverse; determining a trajectory within the drivable area for the vehicle to follow; receiving sensor data from a sensor on the vehicle; detecting, based at least in part on the sensor data, an object in the environment; determining, based at least in part on the sensor data, object parameters associated with the object, wherein the object parameters comprise one or more of a velocity, a position, a classification, or an extent; determining, based at least in part on the object parameters, a modified drivable area; determining, based at least in part on the modified drivable area, that the trajectory is invalid; determining, based at least in part on determining the trajectory is invalid, a modified trajectory; and controlling the vehicle according to the modified trajectory.

B. The method of paragraph A, wherein determining the trajectory is invalid comprises determining, based at least in part on the modified drivable area and the trajectory, a cost, and wherein the cost is based at least in part on a minimum distance to maintain between the vehicle and the object.

C. The method of paragraph B, further comprising: determining, based at least in part on the object parameters, a predicted trajectory of the object, wherein the cost is based at least in part on the predicted trajectory.

D. The method of any of paragraphs A-C, wherein the object parameters indicate a lane change or merge by the object into a lane occupied by the vehicle.

E. The method of any of paragraphs A-D, wherein controlling the vehicle according to the modified trajectory further comprises: controlling the vehicle to follow the object based at least in part on one or more of a relative velocity of the object or a relative distance to the object.

F. The method of any of paragraphs A-E, wherein the classification comprises a car, a bicycle, a motorcycle, or a pedestrian.

G. The method of any of paragraphs A-F, wherein determining that the trajectory is invalid comprises: determining that the trajectory intersects or is within a threshold distance of a boundary of the modified drivable area.

H. A vehicle comprising: a sensor disposed on the vehicle; a processor; and a computer-readable media storing instructions executable by the processor, wherein the instructions, when executed, cause the processor to perform operations comprising: determining a drivable area for the vehicle; determining, based at least in part on the drivable area, a reference trajectory for the vehicle to follow; receiving sensor data from the sensor; determining, based at least in part on the sensor data, object parameters of an object in an environment through which the vehicle is traversing; modifying the drivable area, based at least in part on the sensor data, to generate a modified drivable area; determining, based at least in part on the modified drivable area and the reference trajectory, whether to modify the reference trajectory; and controlling the vehicle based at least in part on whether to modify the reference trajectory.

I. The vehicle of paragraph H, wherein the object parameters comprise one or more of a velocity, a position, a classification, or an extent.

J. The vehicle of paragraph I, wherein the classification comprises a car, a bicycle, a motorcycle, or a pedestrian.

K. The vehicle of any of paragraphs H-J, wherein, modifying the reference trajectory comprises: maintaining a relative distance and a relative velocity between the vehicle and the object.

L. The vehicle of any of paragraphs H-K, wherein the operations further comprise: determining a predicted trajectory of the object; and determining a probability associated with the predicted trajectory, wherein controlling the vehicle is further based at least in part on the probability associated with the predicted trajectory.

M. The vehicle of paragraphs H-L, wherein the object parameters of the object indicate a lane change or a merge.

N. The vehicle of paragraphs H-M, wherein the object parameters of the object indicate a turn at an intersection.

O. The vehicle of paragraphs H-N, wherein the modified drivable area is a first modified drivable area, and wherein the operations further comprise: receiving additional sensor data based on a second object; modifying the drivable area, based at least in part on the additional sensor data, to generate a second modified drivable area; determining, based at least in part on the second modified drivable area and the reference trajectory, a cost; and controlling the vehicle based at least in part on the cost and the first modified drivable area.

P. A non-transitory computer-readable medium storing instruction that, when executed, cause one or more processors to perform operations comprising: receiving sensor data from a sensor on the vehicle; determining a drivable area that represents a region in which a vehicle may traverse; determining a trajectory within the drivable area for the vehicle to follow; determining, based at least in part on the sensor data, an object parameter associated with an object; modifying the drivable area, based at least in part on the object parameter, to generate a modified drivable area; determining, based at least in part on the modified drivable area and the trajectory, a cost; and determining, based at least in part on the cost, whether to modify the trajectory.

Q. The non-transitory computer-readable medium of paragraph P, the operations further comprising: determining a modified trajectory, the modified trajectory comprising a different longitudinal acceleration profile than the trajectory; and controlling the vehicle according to the modified trajectory.

R. The non-transitory computer-readable medium of paragraphs P-Q, wherein the object parameter comprises one or more of a velocity, a position, a classification, or an extent.

S. The non-transitory computer-readable medium of paragraphs P-R, wherein the cost is based at least in part on a distance between the vehicle and a boundary of the modified drivable area, and wherein controlling the vehicle comprises controlling the vehicle based on an acceleration determined based, at least in part, on a relative distance or a relative velocity between the vehicle and the object.

T. The non-transitory computer-readable medium of paragraphs P-S, the operations further comprising: determining that the cost is above a threshold cost; and controlling the vehicle to follow the object.

While the example clauses described above are described with respect to one particular implementation, it should be understood that, in the context of this document, the content of the example clauses can also be implemented via a method, device, system, a computer-readable medium, and/or another implementation.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A method comprising:
   determining a drivable area through an environment for a vehicle, wherein the drivable area represents a region in the environment on which the vehicle is permitted to traverse;
   determining a trajectory within the drivable area for the vehicle to follow;
   receiving sensor data from a sensor on the vehicle;
   detecting, based at least in part on the sensor data, an object in the environment;
   determining, based at least in part on the sensor data, object parameters associated with the object, wherein the object parameters comprise one or more of a velocity, a position, a classification, or an extent;
   determining, as a modified drivable area, based at least in part on the object parameters, and independent of the trajectory, a portion of the drivable area that excludes a space that the object is predicted to occupy based on the object parameters;
   determining, based at least in part on the modified drivable area, that the trajectory is invalid;
   determining, based at least in part on determining the trajectory is invalid, a modified trajectory; and
   controlling the vehicle according to the modified trajectory.

2. The method of claim 1,
   wherein determining the trajectory is invalid comprises determining, based at least in part on the modified drivable area and the trajectory, a cost, and
   wherein the cost is based at least in part on a minimum distance to maintain between the vehicle and the object.

3. The method of claim 2, further comprising:
   determining, based at least in part on the object parameters, a predicted trajectory of the object,
   wherein the cost is based at least in part on the predicted trajectory.

4. The method of claim 1, wherein the object parameters indicate a lane change or merge by the object into a lane occupied by the vehicle.

5. The method of claim 1, wherein controlling the vehicle according to the modified trajectory further comprises:
controlling the vehicle to follow the object based at least in part on one or more of a relative velocity of the object or a relative distance to the object.

6. The method of claim 1, wherein determining that the trajectory is invalid comprises:
determining that the trajectory intersects or is within a threshold distance of a boundary of the modified drivable area.

7. The method of claim 1, wherein the modified drivable area is based at least in part on at least one of a static object or a dynamic object in the environment.

8. A vehicle comprising:
a sensor disposed on the vehicle;
a processor; and
a computer-readable media storing instructions executable by the processor, wherein the instructions, when executed, cause the processor to perform operations comprising:
determining a drivable area for the vehicle;
determining, based at least in part on the drivable area, a reference trajectory for the vehicle to follow;
receiving sensor data from the sensor;
determining, based at least in part on the sensor data, object parameters of an object in an environment through which the vehicle is traversing;
modifying the drivable area, based at least in part on the sensor data and independent of whether the reference trajectory is valid in view of the object, to generate a modified drivable area that excludes a space that is either occupied by the object or that the object is predicted to occupy based on the object parameters;
determining, based at least in part on the modified drivable area and the reference trajectory, whether to modify the reference trajectory; and
controlling the vehicle based at least in part on whether to modify the reference trajectory.

9. The vehicle of claim 8, wherein the object parameters comprise one or more of a velocity, a position, a classification, or an extent.

10. The vehicle of claim 9, wherein the classification comprises a car, a bicycle, a motorcycle, or a pedestrian.

11. The vehicle of claim 8, wherein, modifying the reference trajectory comprises:
maintaining a relative distance and a relative velocity between the vehicle and the object.

12. The vehicle of claim 8, wherein the operations further comprise:
determining a predicted trajectory of the object; and
determining a probability associated with the predicted trajectory,
wherein controlling the vehicle is further based at least in part on the probability associated with the predicted trajectory.

13. The vehicle of claim 8, wherein the object parameters of the object indicate a lane change or a merge.

14. The vehicle of claim 8, wherein the object parameters of the object indicate a turn at an intersection.

15. The vehicle of claim 8, wherein the modified drivable area is a first modified drivable area, and wherein the operations further comprise:
receiving additional sensor data based on a second object;
modifying the drivable area, based at least in part on the additional sensor data, to generate a second modified drivable area;
determining, based at least in part on the second modified drivable area and the reference trajectory, a cost; and
controlling the vehicle based at least in part on the cost and the first modified drivable area.

16. A non-transitory computer-readable medium storing instruction that, when executed, cause one or more processors to perform operations comprising:
receiving sensor data from a sensor on a vehicle;
determining a drivable area that represents a region in which the vehicle is permitted to traverse;
determining a trajectory within the drivable area for the vehicle to follow;
determining, based at least in part on the sensor data, an object parameter associated with an object;
modifying the drivable area, based at least in part on the object parameter and independent of the trajectory, to generate a modified drivable area that excludes a space that is either occupied by the object or that the object is predicted to occupy based on the object parameter;
determining, based at least in part on the modified drivable area and the trajectory, a cost;
determining, based at least in part on the cost, whether to modify the trajectory; and
controlling the vehicle based at least in part on the modified drivable area.

17. The non-transitory computer-readable medium of claim 16, the operations further comprising:
determining a modified trajectory, the modified trajectory comprising a different longitudinal acceleration profile than the trajectory; and
controlling the vehicle according to the modified trajectory.

18. The non-transitory computer-readable medium of claim 16, wherein the object parameter comprises one or more of a velocity, a position, a classification, or an extent.

19. The non-transitory computer-readable medium of claim 16, wherein the cost is based at least in part on a distance between the vehicle and a boundary of the modified drivable area, and
wherein controlling the vehicle comprises controlling the vehicle based on an acceleration determined based, at least in part, on a relative distance or a relative velocity between the vehicle and the object.

20. The non-transitory computer-readable medium of claim 16, the operations further comprising:
determining that the cost is above a threshold cost; and
controlling the vehicle to follow the object.

* * * * *